United States Patent [19]

Wetzel

[11] 4,413,412
[45] Nov. 8, 1983

[54] MOTOR-DRIVEN SCRAPING TOOL

[75] Inventor: Ludwig Wetzel, Pforzheim, Fed. Rep. of Germany

[73] Assignee: Firma Schmid & Wezel, Maulbronn, Fed. Rep. of Germany

[21] Appl. No.: 289,519

[22] Filed: Aug. 3, 1981

[30] Foreign Application Priority Data

Aug. 1, 1980 [DE] Fed. Rep. of Germany ....... 3029193

[51] Int. Cl.³ .............................................. B23D 79/06
[52] U.S. Cl. ................................................... 30/169
[58] Field of Search ................. 30/169, 272 R, 272 A, 30/241; 173/114

[56] References Cited

U.S. PATENT DOCUMENTS

| 3,195,232 | 7/1965 | Toth | 30/169 |
| 3,285,136 | 11/1966 | Wezel | 30/169 |
| 3,988,829 | 11/1976 | Sumida | 30/241 |
| 4,231,155 | 11/1980 | Johne | 30/169 |

Primary Examiner—Jimmy C. Peters
Attorney, Agent, or Firm—Michael J. Striker

[57] ABSTRACT

A motor-driven scraping tool has an elongated supporting element and a receiving head arranged on its free end portion in an adjustable member, wherein an adjusting device is formed by one bendable tongue which forms a guiding face of the receiving head and an adjusting screw which bends the tongue relative to the supporting element, or more particularly relative to a counterguide.

13 Claims, 2 Drawing Figures

MOTOR-DRIVEN SCRAPING TOOL

BACKGROUND OF THE INVENTION

The present invention relates to a motor-driven scraping tool.

Motor-driven scraping tools are known in the art. A known motor-driven scraping tool has an axially displaceable elongated supporting element or rod provided at its free end with a head for receiving a scraping member. The receiving head has a flat side with two guiding faces which cooperate with counterguides, and the play between the guiding faces and the counterguides can be adjusted relative to one another. In the known motor-driven scraping tool, the counterguides are formed by conical members which are adjustably arranged with their inclined faces against a projecting part of the housing for adjustment of the above-mentioned play. The manufacture of the inclined faces and the wedge-shaped guiding members is expensive, and the auxiliary operations for play adjustment in the event of wear are relatively complicated and expensive.

SUMMARY OF THE INVENTION

Accordingly, it is an object of the present invention to provide a motor-driven scraping tool which avoids the disadvantages of the prior art.

More particularly, it is an object of the present invention to provide a motor-driven scraping tool which has parts which are manufactured in a simple way and provide for especially fast and exact play adjustment.

In keeping with these objects and others which will become apparent hereinafter, means for play adjustment in the inventive motor-driven scraping tool is formed as a bendable tongue which forms a guiding face and is provided in a receiving head which is arranged on a free end portion of a supporting element, and an adjusting screw arranged to bend the tongue relative to the supporting element.

The guiding faces formed by the tongues cooperate with counterguides, which thereby can be formed as flat guiding plates which must not be adjusted during mounting on the projecting part of the housing. The play adjustment may be performed by rotation of the adjusting screw or two adjusting screws in the event of two guiding faces, whereby fine adjustment is attained without detaching, displacing and again tensioning of parts of the tool.

In accordance with another advantageous feature of the present invention, two bendable tongues are provided symmetrical in the receiving head and formed by two lateral grooves. The depth of the groove and the thickness of the tongue are selected so as to influence the correspondence and the possible adjustment region.

In accordance with still another advantageous feature of the present invention, the adjusting screw or screws are arranged in a part of the receiving head, which is located at one side of the groove or grooves. It is advantageous to use self-locking screws so that counternuts can be dispensed with.

For attaining a low weight of the receiving head, the power-driven scraping tool in accordance with a further advantageous feature of the present invention has a U-shaped cross section, and the grooves and tongues are formed in a bottom part of the receiving head whereas the adjusting screws are arranged in both legs of the receiving head and extend in the direction of elongation of the legs. The inner faces of the bottom part and the legs form a recess for receiving abutment faces for abutting the scraping member.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENT

Figure 1:
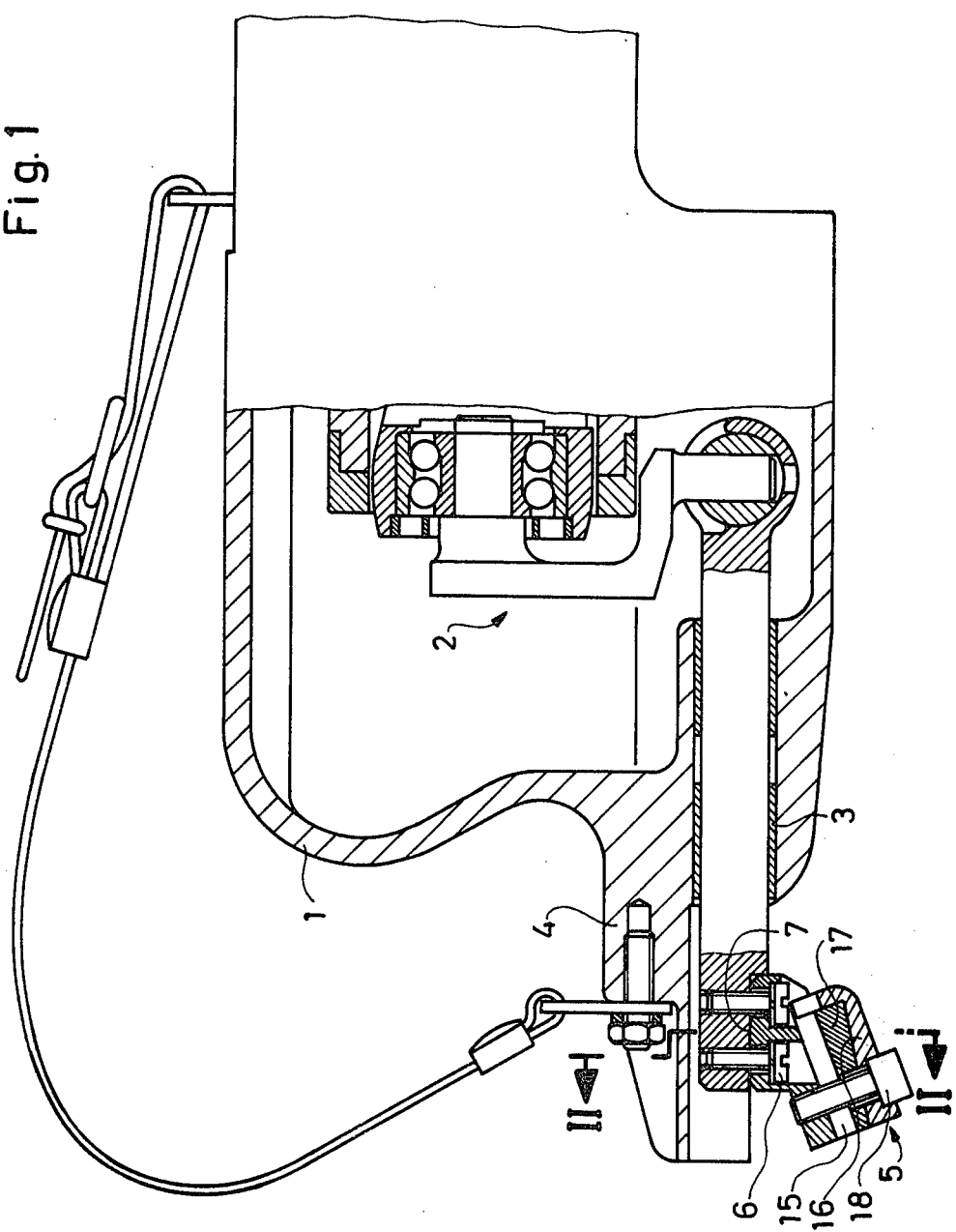
FIG. 1 is a view showing a partial section of a motor-driven scraping tool in accordance with the present invention.

A motor-driven scraping tool has a housing 1 and an elongated element or rod 3 which is movable in an axial direction via a wobble drive 2.

The elongated element 3 has a free end portion which extends outwardly of a projecting housing part 4 and supports a receiving head 5 for receiving a scraping tool. The receiving head 5 is detachably mounted on the free end portion of the elongated element 3 with the aid of two screws 6.

The elongated element 3 has a circular cross section provided with a flattening 7 for mounting the receiving head 5. The receiving head 5 has a flat side 8 which abuts against the flattening 7 of the elongated element 3. The flat side 8 is formed as a flat face and forms laterally two parallel guiding faces 9 which cooperate with two counterguides 10. The counterguides 10 are formed by two flat guiding plates 11 which are connected with the projecting housing part 4 of the housing 1.

Figure 2:
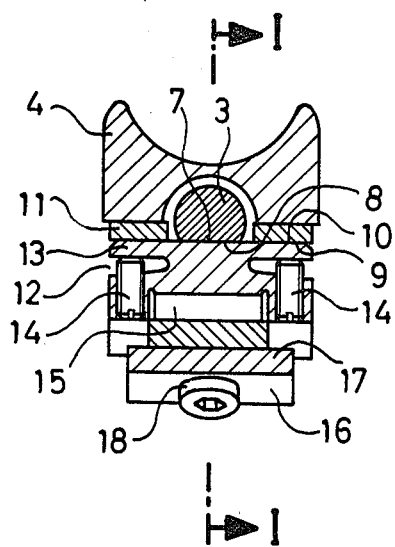
FIG. 2 is a view showing a section of a receiving head of the inventive scraping tool, taken along the line II—II in FIG. 1.

The receiving head 5 has, as can be seen from FIG. 2, a U-shaped cross section having a bottom and two legs. The bottom of the receiving head 5 forms the flat side 8. The receiving head 5 has two lateral grooves 12 provided in the region of the guide plates 11 and forming two bendable tongues 13. Two adjusting screws 14 extend through the legs of the receiving head 5 in the direction of elongation of the legs. The adjusting screw 14 is displaceable in the legs of the receiving head 5 and cooperate with the tongues 13 so as to bend the latter against the respective guiding plates 11.

The adjusting screws 14 are formed as self-locking screws. Thereby no particular securing means such as counternuts or the like are required for locking the adjusting screws 14. The play between the guiding faces 9 of the receiving head 5 and the counterguides 10 formed by the guiding plates 11 can thereby be adjusted and corrected in fast and convenient manner.

The interior of the U-shaped receiving head 5 forms a recess 15 for receiving a not shown scraping member. The inner faces of the bottom and the legs of the U-shaped receiving head 5 form abutment faces for the scraping member. The scraping member is tightened by a bracket 16 and a wedge plate 17 with the aid of a screw 18.

It will be understood that each of the elements described above, or two or more together, may also find a useful application in other types of constructions differing from the types described above.

While the invention has been illustrated and described as embodied in a motor-driven scraping tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A motor-driven scraping tool, comprising a housing; drive means; an elongated supporting element having an axis and displaceable in an axial direction by said drive means, said supporting element having a free end portion; a receiving head for receiving a scraping member and arranged on said free end portion of said supporting element, said receiving head having two guiding faces for guiding said receiving head relative to said supporting member; and means for adjusting the play between said guiding faces of said receiving head and said supporting member, said adjusting means including at least one bendable tongue formed in said receiving head and forming one of said guiding faces, and at least one adjusting screw arranged to bend said one tongue relative to said supporting element.

2. A motor-driven scraping tool as defined in claim 1, wherein said supporting element has two counter guides with which said guiding faces of said receiving head cooperate, respectively.

3. A motor-driven scraping tool as defined in claim 1, wherein said adjusting means includes a second such tongue formed in said receiving head and forming the other of said guiding faces, and a second such adjusting screw arranged to bend said second tongue relative to said supporting element.

4. A motor-driven scraping tool as defined in claim 1, wherein said receiving head has lateral sides and is provided at at least one of said lateral sides with a groove which forms said bendable tongue.

5. A motor-driven scraping tool as defined in claim 3, wherein said receiving head has lateral sides and is provided at said lateral sides with symmetrical grooves forming said bendable tongues.

6. A motor-driven scraping tool as defined in claim 5, wherein said receiving head has a longitudinal central plane, said grooves and said tongues being symmetrical relative to said longitudinal central plane.

7. A motor-driven scraping tool as defined in claim 1, wherein said receiving head has a part located at one side of said groove, said adjusting screw being arranged in said one part of said receiving head.

8. A motor-driven scraping tool as defined in claim 7, wherein said receiving head has another part located at an opposite side of said groove and forming said tongue.

9. A motor-driven scraping tool as defined in claim 1, wherein said adjusting screw is a self-locking screw.

10. A motor-driven scraping tool as defined in claim 5, wherein said receiving head is U-shaped and has a bottom and two elongated legs extending therefrom, said grooves and said tongues being formed in said bottom of said receiving part, and said adjusting screws extending through said legs in the direction of elongation of the latter.

11. A motor-driven scraping tool as defined in claim 10, wherein said bottom and said legs of said receiving head have inner faces forming a recess for receiving and abutment faces for abutting the scraping member.

12. A motor-driven scraping tool as defined in claim 2; and further comprising a housing having a projecting part, said two counter guides being formed as two exchangeable guiding plates mounted on said projecting part of said housing.

13. A motor-driven scraping tool as defined in claim 12, wherein said receiving head has a flat side provided with said guiding faces, said guiding plates being flat and extending parallel to said supporting element.

* * * * *